United States Patent [19]
Johnson

[11] 3,774,062
[45] Nov. 20, 1973

[54] STATOR ASSEMBLY FOR SINGLE PHASE INDUCTION MOTOR EMPLOYING ALUMINUM ALLOY STARTING WINDING

[75] Inventor: John H. Johnson, Holland, Mich.

[73] Assignee: General Electric Company, Fort Wayne, Ind.

[22] Filed: Dec. 20, 1971

[21] Appl. No.: 209,673

[52] U.S. Cl. .............................. 310/184, 310/254
[51] Int. Cl. ............................................ H02k 3/02
[58] Field of Search.................... 310/184, 185, 198, 310/199, 166, 180, 254; 79/576

[56] References Cited
UNITED STATES PATENTS

| | | | |
|---|---|---|---|
| 3,515,919 | 6/1970 | Houtman | 310/166 |
| 3,528,171 | 9/1970 | Houtman | 29/576 |
| 2,923,873 | 2/1960 | Annis | 310/184 X |

OTHER PUBLICATIONS

Bus Conductor Handbook, Alcoa Aluminum, p. 201, 1957

*Primary Examiner*—D. F. Duggan
*Attorney*—John M. Stoudt et al.

[57] ABSTRACT

Stator assembly for a motor includes slotted magnetic core with main and auxiliary windings in core slots. Main winding comprises at least two sections each forming a main pole. Auxiliary winding in form of a starting winding also includes at least two sections forming poles angularly displaced from the main poles. Each starting winding is formed of a material that yields the same motor operating performance as a copper starting winding design with a backlash section and yet is provided with fewer, if any, backlash turns as compared to such copper winding arrangement. Preferred auxiliary winding materials have an electrical conductivity of about 29% IACS (International Annealed Copper Standard), a density of about 0.1 pound per cubic inch, and a specific heat at 25° Centigrade of about 0.2 calories per gram per degree Centigrade. When alloy materials are used, the major alloying material or materials, in terms of percentage by weight of the alloy, comprise a sufficiently large percent of the alloy (by weight) that normal manufacturing and processing variations causing variations in the amount of such alloying material or materials still permit the economical manufacture of an alloy having a desired nominal resistivity.

10 Claims, 4 Drawing Figures

INVENTOR:
John H. Johnson,
BY Ralph E. Krisher Jr.

ATTORNEY.

STATOR ASSEMBLY FOR SINGLE PHASE INDUCTION MOTOR EMPLOYING ALUMINUM ALLOY STARTING WINDING

BACKGROUND OF THE INVENTION

This invention relates to inductive devices in general and, more particularly, to motors and stator assemblies for motors for use in applications wherein various desirable motor characteristics during starting conditions of a motor are at least partly derived from the characteristics of an auxiliary winding.

Single phase, alternating current induction motors of various types conventionally include a main (e.g., running) field winding and an auxiliary (e.g., starting) field winding, the two windings being angularly displaced on a stator core member. Upon energization of the two windings, phase displaced currents in the windings result in starting torque for the motor.

In one type of single phase induction motor, referred to as a resistance split-phase motor, the main winding is arranged in stator core slots to have relatively high inductance and relatively low resistance, whereas the auxiliary winding is arranged to have a relatively low inductance and relatively high resistance. By preselecting the difference between the resistance-to-reactance ratios of the main and auxiliary windings, a desired phase displacement in winding currents and thus starting torque may be obtained. With this type of motor, the auxiliary winding is desirably de-energized when a predetermined operating condition is attained, e.g., when the motor attains a predetermined speed.

In many applications, de-energization of the auxiliary winding is effected by control means in the form of a centrifugal switch mechanism which is directly responsive to the attained speed of the motor. In other applications other means are used. For example, in hermetically sealed motor applications, it is desirable to use types of control means that are located outside the hermetically sealed motor chamber.

One particular type of auxiliary winding circuit control means that has been used heretofore has included a commercially available current responsive relay, with the relay coil connected in series with the main field winding and with normally open contacts of the relay connected in series with the auxiliary winding. In operation, the main winding current during an initial energization interval energizes the relay coil and the relay contacts close, thereby to energize the starting winding. Thereafter, as the motor speed increases from standstill, the main winding current is reduced in magnitude and the relay contacts open. Thus, the auxiliary winding is de-energized when the main winding current falls to a predetermined relay dropout current value. This will desirably occur at a predetermined speed, generally selected to be around 3,200 r.p.m. in the case of a two pole motor energized by a 60 hertz voltage source.

For a given main winding arrangement, care must be taken to insure that the contacts of a given relay will close when the locked rotor current of the main winding flows through the relay coil; and to insure that the main winding current (and relay coil current) will decrease an amount sufficient to cause the relay to drop out, i.e., open its contacts, only after the motor has accelerated to a preselected speed. Thus, it is desirable that the relay drop out only after sufficient time has elapsed to permit the attainment of the preselected speed. In addition, it will be appreciated that, for a given main winding arrangement and current relay, the main winding current at a given speed during starting conditions is a function of (among other things) the reactance of the auxiliary winding. Relay characteristics are also described in co-pending application Ser. No. 56,935 filed July 21, 1970 in the name of Smith et al. The disclosure of that application is specifically incorporated herein by reference.

One factor which must be considered in the overall design of a resistance split-phase motor that is to be used with a start relay is the dropout torque of the motor, i.e., the torque supplied by the motor at the time when the relay drops out, the dropout torque also being a function of the resistance-to-reactance ratios of the main and auxiliary windings. It has been determined that the main winding current of a resistance split-phase motor will, in general, cause desirable relay operation, when the resistance of the effective starting winding turns is high relative to the resistance of the effective main winding turns. For a specified main winding arrangement, therefore, desirable relay operation will normally occur when the resistance of the starting winding circuit is relatively high. However, while relatively high winding resistances are desirable for relay operation, such high resistance conditions are undesirable for other reasons.

For example, relatively high winding resistances may result in relatively high temperature rises in the start winding. While high temperature rises are objectionable in general, they are particularly objectionable in those applications where the permissible temperature rise of a motor winding should be relatively low. One type of such application are those where the winding would be confined in a closed container, e.g., a hermetically sealed enclosure.

It is known that the temperature rise of a motor winding is a function of (among other things) the current density within the motor winding conductors. It will thus be appreciated that, for a given winding conductor material and a given winding current, a desired increase in winding resistance may usually not be accomplished by merely decreasing the diameter of the winding material because of an undesired winding temperature rise that would result from the increased current density in the winding conductors.

Still another relationship that should be kept in mind when considering the temperature rise of a motor winding is the resistivity, weight density, and specific heat of the winding material, in view of the fact that temperature rise or rate of such rise of a conductor is generally proportional to the product of the current density squared times the resistivity, divided by the product of the weight density and specific heat of the conductor. The temperature rise of a winding is of course important by itself, or when a motor user specifies a maximum temperature rise or rate of temperature rise that will be acceptable to such customer. However, temperature rise may also be important due to the increase in winding resistance that one normally expects to be associated with an increase in winding temperature and the corresponding reduction in locked rotor torque that in turn results from increased start winding resistance in resistance split-phase motors.

In the early development of the motor art, including the hermetic motor art; both the main and starting windings were formed of copper wire. However, particularly in the case of hermetic motor parts, a starting winding having a desired number of turns formed of copper wire with a sufficiently small diameter to provide a desired resistance for preferred relay operation would have resulted in an excessive winding temperature rise. For this reason, external resistors were employed in series with the starting winding in order to provide a desired high starting circuit resistance while forming the starting winding per se from copper conductors sufficiently large in size so that the winding current density and rise would not exceed acceptable levels. For example, some motor users specify that current density should not exceed 25,000 or 30,000 amps. per square inch of conductor and a maximum temperature rise rate of about 13°F per second. Other users, on the other hand, may find current densities of 50,000 or 60,000 amps. per squre inch acceptable.

Later, in order to eliminate the external resistor, attempts were made to utilize phosphor bronze wire as the starting winding conductor. In theory, the resistivity and weight density of phosphor bronze materials could be attained so that a desired high winding circuit resistance could be attained without an external resistor and so that starting winding current densities and temperature rise would remain within acceptable limits. For example phosphor bronze having a by weight copper content of about 98.75 percent copper and a by weight tin content of about 1.25 percent would have a conductivity of about 44% that of commercial copper electrical conductors; a weight density of about 8.89 gms/cc (about 0.321 lbs/in$^3$); and a specific heat at about 25°C of about 0.09 cal/°C/gm (about 170.9 joules/°C/lb).

However, it will be understood that use of phosphor bronze wire would add appreciably to the cost of a motor because of the cost of the material. For example, one pound of the alloy would contain about 0.99 of a pound of copper. In addition, the resistivity of 1.25 percent phosphor bronze wire is known to vary to such an extent from lot to lot, that it would be necessary to vary the diameter of the wire from lot to lot in order to obtain wire having a desired or specified resistance per unit length of wire.

It will be understood that the necessity of establishing a different diameter of wire for each lot of wire, depending on the resistivity of the material, would be expensive in practice. Moreover, variations in wire size from one lot to another would be troublesome to motor manufacturers who design motors so that core slots will have a desired winding space factor and who utilize winding generating and handling equipment whose satisfactory operation under a given set of conditions would be more consistent with a single, predictable, wire diameter.

For these and other reasons, a "backlash" winding rather than a phosphor bronze approach has been used extensively in practice. The general backlash approach that was first adopted is still followed today.

By way of background, a backlash winding provides a motor design engineer with a technique of obtaining an essentially continuously variable winding resistance for a given number of effective winding turns. In practice, the backlash approach involves winding a desired number of inductive turns and then adding an additional or excess length of winding in order to establish a total winding resistance desired for a particular motor design.

In other words, wire having a sufficiently large diameter to avoid excessive current densities and temperature rise is employed in a sufficient length to provide the desired resistance. The length of wire in excess of that needed for the desired number of inductive turns is accommodated in a "backlash" winding section. The backlash winding section includes equal numbers of forward and reverse turns with the inductance of the reverse wound turns cancelling out the inductance of the forward wound turns.

While the backlash winding approach has provided a means of attaining a desired winding resistance and winding temperature rise characteristic for many years, the approach has been expensive in practice because lengths of winding material are provided purely for the sake of increasing the over-all winding resistance. These extra turns do not otherwise contribute to the motor performance. The "backlash" technique thus adds appreciably to the over-all cost of a motor.

In addition, if the backlash winding coils are manually arranged, an operator must be sure to reversely dispose half of the turns in the backlash section. On the other hand, if a winding machine is programmed to wind the reverse or backward turns, the machine must come to a halt after winding all of the forward turns, reverse directions, and then wind the reversely disposed turns in the backlash section. This also is costly because of the expense associated with more complex winding equipment and the expense of extra machine and operator time that is required due to stopping and reversing the winding direction of the winding equipment. It will thus be appreciated that it would be desirable to reduce, if not eliminate, the number of backlash winding turns that have heretofore been considered to be necessary for a given winding arrangement in many given motor designs.

Based on economic considerations, e.g., the relative cost of copper vis-a-vis aluminum winding materials, it is expected that the substitution of aluminum magnet wire for copper magnet wire for both main and auxiliary windings will become increasingly desirable. However, the resistivity (sometimes also called specific resistance) of aluminum is about 2.828 micro-ohm centimeters at 20° Centigrade as compared with about 1.724 for copper. Thus, about 1.6 times more volume of aluminum wire per unit length must be employed in order to obtain the same winding resistance as would be obtained with a unit length of copper wire. Thus, for unit lengths of copper and aluminum wire that are each to have a given resistance, the cross-sectional area of the aluminum wire must be 1.6 times greater than the cross-sectional area of the copper wire. It will therefore be appreciated that, particularly for aluminum winding motor designs, winding turns in a "backlash" section (which do not contribute to running performance of a motor) would occupy space which could otherwise be used to accommodate winding turns that could contribute to the running performance of the motor.

U.S. Pat. No. 3,348,183 to Ralph E. Hodges and Francisco C. Avila, assigned to the same assignee as the present application, discloses, inter alia, a method of compacting an insulated coil formed of enameled aluminum magnet wire, and U.S. Pat. Nos. 3,515,919 and 3,528,171 to Jack A. Houtman, also assigned to the same assignee as the present application, disclose (among other things) a stator assembly for a single phase induction motor wherein the main winding is formed of aluminum magnet wire. In these Houtman patents, the main winding coils share slots with the auxiliary winding coils and are compacted in order to accommodate the auxiliary winding coils. This compacting approach has permitted the accommodation, in many designs, of increased volumes of aluminim conductor within a given amount of magnetic core slot volume. However, even when following the Hodges et al. and Houtman teachings, it has not been possible to convert many copper motor designs to aluminum winding designs. At least some of this problem is due to the need for aluminum backlash windings in such designs.

Thus, in at least some designs wherein aluminum main windings have been utilized, it has still been necessary to use copper starting winding coils rather than aluminum because of the lack of available magnetic core slot space or volume. For example, in one existing aluminum main winding motor design which has been examined, a copper starting winding having a total of 208 turns were used and of the 208 turns, 68 turns (or over 32 percent) of the total turns were the forward and reverse turns of a backlash winding section. Assuming that the number of turns in the backlash winding section could be reduced or eliminated, the winding slot space that would then be made available could desirably be utilized to accommodate the increased volume of an aluminum conductor and result in a savings due to the change in winding material as well as due to the reduction or elimination of manufacturing costs associated with backlash winding sections.

It will be understood therefore from the foregoing, that it would be generally desirable to provide motor winding arrangements for various motor part designs wherein the number of winding turns in a backlash winding section of a wound stator core are reduced, if not eliminated.

In addition, it would be desirable to provide new and improved arrangements for resistance split-phase motor parts whereby the number of backlash winding turns, needed for a desired level of operational performance while utilizing copper starting windings, may be reduced (if not eliminated) while retaining a nominal starting winding electrical resistance, and temperature rate of rise so that savings associated with reduced or eliminated backlash winding turns may be realized without a sacrifice or reduction in motor operational performance.

SUMMARY OF THE INVENTION

It is accordingly a general object of the present invention to provide an improved winding arrangement for an inductive device.

It is a more specific object of the present invention to provide a stator assembly for a dynamoelectric machine wherein desired auxiliary winding characteristics, consistently attainable heretofore only with the use of external resistors or backlash windings, may be attained with an uncomplicated winding arrangement wherein backlash winding turns are reduced in number, if not eliminated entirely.

It is another object of the present invention to provide an improved auxiliary winding arrangement whereby a material, not heretofore used as a dynamoelectric machine conductor, may be utilized in the formation of dynamoelectric machine auxiliary windings.

Still another object of the present invention is to provide an improved stator assembly for a resistance split-phase induction motor employing a starting winding formed of an aluminum alloy.

A further object of the invention is to provide an improved stator assembly for a resistance split-phase induction motor wherein the starting winding comprises a winding material having predetermined resistivity, weight density, and specific heat characteristics such that a desired level of motor performance may be achieved with fewer turns (if any at all) of winding material in a backlash winding section than would be needed for a similar level of motor performance with a copper starting winding.

In accordance with one preferred form of the invention, a stator assembly is disclosed herein for a two pole resistance split-phase induction motor including a stator formed of a magnetic core having a plurality of closed end winding accommodating slots. Main and auxiliary windings are disposed in these slots. The main winding comprises two sections each forming a main pole. Each main winding section includes a plurality of coils of progressively greater pitch each having sides occupying a different pair of slots. The exemplified auxiliary winding is a starting winding that also comprises two sections forming two poles angularly displaced from the main poles. Each starting winding section includes a plurality of coils of progressively greater pitch each having sides occupying a different pair of slots. In the illustrated embodiment, the auxiliary winding is a starting winding formed of a material that will yield the same performance as a copper starting winding design with a backlash section and yet is provided with fewer, if any, backlash turns as compared to such copper winding arrangement. In one preferred exemplification, the starting winding has an electrical conductivity of about 29% IACS (International Annealed Copper Standard), a density of about 2.6 grams per cubic centimeter, and a specific heat at 25° Centigrade of about 0.2 calories per gram - degree Centigrade. In the illustrated embodiment, the starting winding is a non-copper base alloy, the major alloying material or materials, in terms of percentage by weight of the alloy, comprising a sufficiently large percent of the alloy (by weight) that normal manufacturing and processing variations causing variations in the amount of such alloying material or materials nonethelss permit the economial manufacture of an alloy having a predictable resistivity of a nominal value. In a preferred aluminum based alloy winding material, the major alloying material or constituent comprises between 4 percent and 6 percent (e.g., 4.5 - 5.6 percent) by weight of the alloy.

In addition to accomplishing the above stated and other objects of the invention, other unexpected benefits and advantages may also be obtained when utilizing the invention in the exemplified forms. For example, improved winding distributions may be obtained that contribute to increased locked rotor torque. Moreover, a measurable reduction in drop off in locked rotor torque because of winding heating may be accomplished.

The subject matter which I regard as my invention is particularly pointed out and distinctly claimed in the concluding portion of this specification. My invention itself, however, both as to its organization and method of operation, together with further objects and advantages thereof, may best be understood by reference to the following description taken in connection with the accompanying drawings.

DESCRIPTION OF THE PREFERRED EMBODIMENTS

Figure 1:
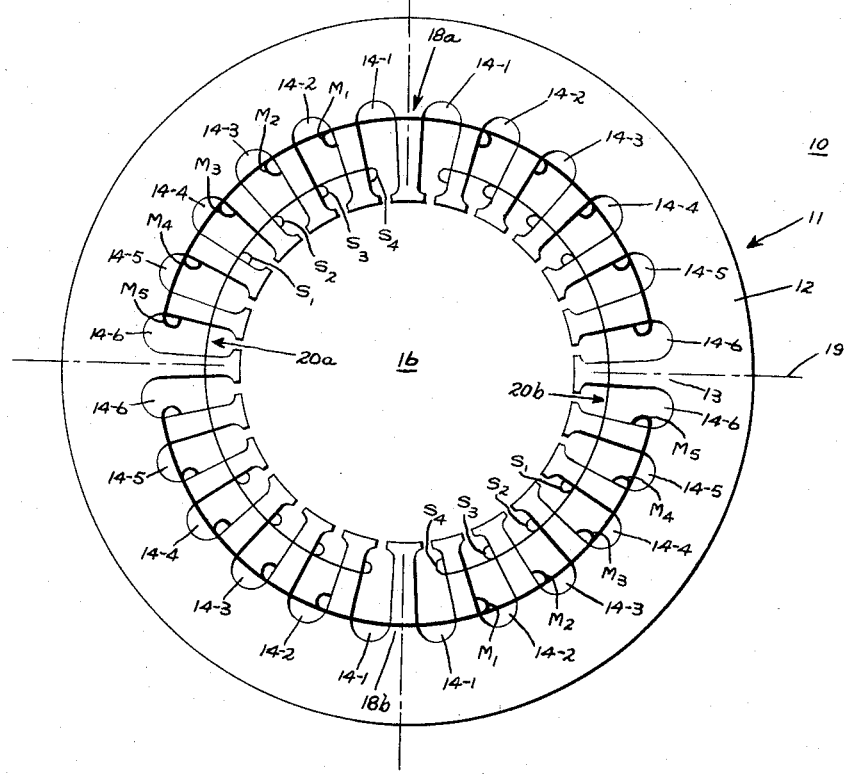
FIG. 1 is a partly schematic end view showing a typical two pole, resistance split-phase, alternating current induction motor stator assembly and is useful as an aid in describing prior arrangements as well as embodiments of the present invention.

Referring now to FIG. 1 of the drawings, there is shown a stator assembly for a two pole, resistance split-phase, alternating current induction motor. The stator assembly, generally indicated at 10, comprises a stator core member 11 which may be formed of a plurality of stacked relatively thin laminations of magnetic material. Core member 11 includes yoke portion 12 having a plurality of teeth 13 extending radially inwardly therefrom to define winding slots 14 therebetween, inner ends 15 of teeth 13 mutually defining a bore 16 for receiving the usual squirrel cage rotor member (not shown). In the exemplification, the teeth 13 have been shown as being equally spaced apart and bounding 24 equally spaced apart and similar winding slots 14, but it will be understood that the invention may also be practiced with cores made with laminations having what are known as graded slots or graded teeth and including those having nonradial teeth, as well as other slot configurations that may be desired.

Figure 2:
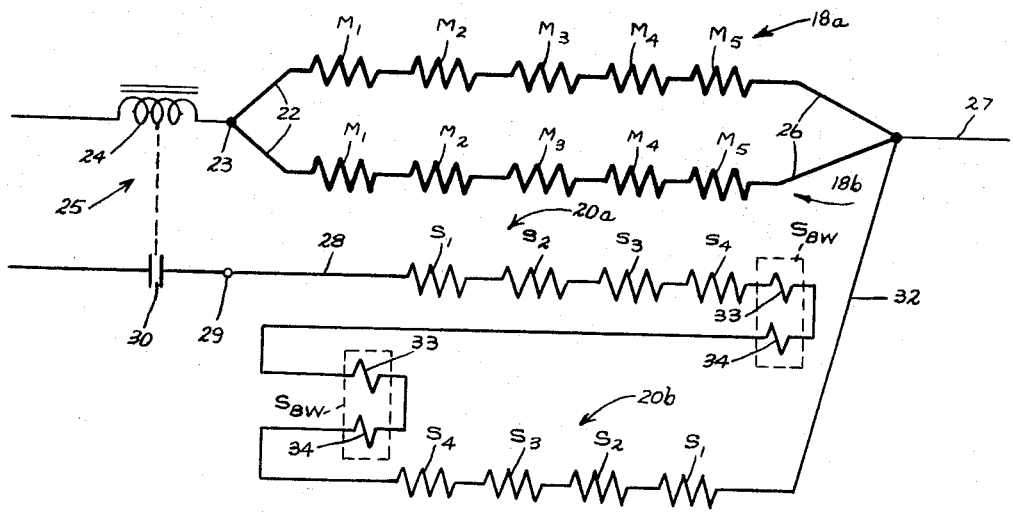
FIG. 2 is a diagram schematically showing the electrical connections of the main and starting windings of the stator assembly of FIG. 1 and also showing, within a phantom line enclosure, one arrangement of backlash windings known and used heretofore.

A main or running field winding is provided disposed in certain predetermined slots 14 so as to form two diametrically opposite main poles aligned on the axis shown by the dashed line 17. The main winding is divided into two sections 18a and 18b each forming one of the main poles. In the assembly 10, each of the main winding sections 18a, 18b comprises five concentric coils of progressively greater pitch respectively designated $M_1$, $M_2$, $M_3$, $M_4$, and $M_5$. As shown in FIG. 2, main winding sections 18 and 18b are connected in parallel, however, in certain applications the main winding sections may be serially connected.

Considering main winding section 18a, the sides of the smallest pitched coil $M_1$ respectively occupy a pair of slots 14-2 on opposite sides of axis 17 with slots 14-1 therebetween. The sides of main winding coils $M_2$, $M_3$, $M_4$, and $M_5$ respectively occupy pairs of slots 14-3, 14-4, 14-5 and 14-6. The sides of main winding coils $M_1$ through $M_5$, for convenience, are respectively positioned at the bottoms or closed ends of the pairs of slots 14-1 through 14-6. Thus The main winding coils $M_1$ through $M_5$ of the other main winding section 18b are similarly positioned in corresponding slots 14, as shown in FIG. 1.

An auxiliary or starting field winding is similarly disposed in certain predetermined slots 14 and forms two diametrically opposite auxiliary or starting poles aligned about an axis (angularly spaced in quadrature or non-quadrature relationship to axis 17) shown by dashed line 19. The starting winding is divided into two serially connected sections 20a, 20b which respectively form the diametrically opposite auxiliary or starting poles. In the illustrated embodiment, each of the starting winding sections 20a, 20b comprises four concentric coils of progressively greater pitch respectively designated $S_1$, $S_2$, $S_3$, and $S_4$.

Referring now to starting winding section 20a, the sides of coil $S_1$ share the pair of slots 14-4, on opposite sides of axis 19, with the sides of coils $M_3$ of main winding sections or parts 18a, 18b. The sides of coil $S_2$ share slots 14-3 with the sides of coils $M_2$ and the sides of coils $S_3$ share slots 14-2 with the sides of coils $M_1$. The sides of the largest pitched coil $S_4$ are the sole occupants of the pair of slots 14-1, and the sides of coils $S_1$, $S_2$ and $S_3$ are respectively wound or placed over the respective sides of coils $M_3$, $M_2$ and $M_1$. The starting coils $S_1$ through $S_4$ of the other starting winding section 20b are similarly positioned in corresponding slots 14 on the opposite side of stator core 11 as shown in FIG. 1.

The side of coils $M_1$, $M_2$ and $M_3$ of main winding sections 18a, 18b which respectively share slots with sides of starting winding coils $S_3$, $S_2$, and $S_1$ are preferably, but not necessarily, pressed back to facilitate accommodation of the starting winding coil sides. Particularly when the main windings are formed of aluminum wire, it may also be desirable to compact the main windings prior to placement of the start windings.

Referring additionally to FIG. 2, ends 22 of main winding sections 18a, 18b are shown connected to external terminal 23 having coil 24 of current responsive relay 25 connected in series therewith. Ends 26 of main winding sections 18a, 18b are shown connected together at a common connection to lead 27 with end 32 of the starting winding section 20b. This common connection is often buried, and common lead 27 may then be used to provide means for making the common connection. End 28 of starting winding section 20a is connected to external terminal 29 having contacts 30 of relay 25 serially connected therewith.

Although FIG. 2 does not clearly illustrate the fact, it is sometimes necessary, according to prior practice, to distribute a backlash winding in several slots, i.e., arrange or wind two or more coils (such as coils $S_3$ and $S_4$ in FIG. 2) so that each will include some forward and backward turns of a backlash winding section. This is done, for example, when such a large number of backlash turns are needed that the outermost coil slots cannot physically accommodate all of the backlash turns.

In a previously known two pole, resistance split-phase, alternating current induction motor incorporating a main winding formed of 0.0380 inch diameter EC (electrical conductor) grade aluminum wire having a resistance of about 3.22 ohms per pole or section, the starting winding was formed of 0.0179 inch diameter copper wire having a resistance, to three significant figures, of about 12.6 ohms. Coils $M_1$, $M_2$, $M_3$, $M_4$, and $M_5$ of each winding section or pole 18a, 18b, respectively had 34, 50, 50, 68, and 68 turns for a total of 270 turns per pole or section. Each of the coils $S_1$, $S_2$, and $S_3$ of each starting winding section 20a, 20b respectively had 21, 30, and 34 turns; and coils $S_4$ of each starting winding section 20a, 20b had 67 forward wound turns and 39 reverse wound turns for a total of 106 turns in each of coils $S_4$. The total number of turns per starting winding section was thus 191 turns. Of the 106 turns in each coil $S_4$, 78 turns (i.e., 39 forward wound plus 39 reverse wound) were backlash turns, leaving 28 net effective turns in coil $S_4$. Thus about 40 percent of each 191 start turns were backlash turns.

The material used in fabricating the stator assembly for this motor included about 0.777 pounds of EC aluminum wire in the main winding with a conductor length of about 276 feet per main pole; and about 0.386 pounds of copper wire in the auxiliary or starting winding with a conductor length of about 192 feet per pole and a resistance of about 12.6 ohms. Main winding resistance per pole was about 3.22 ohms.

Figure 3:
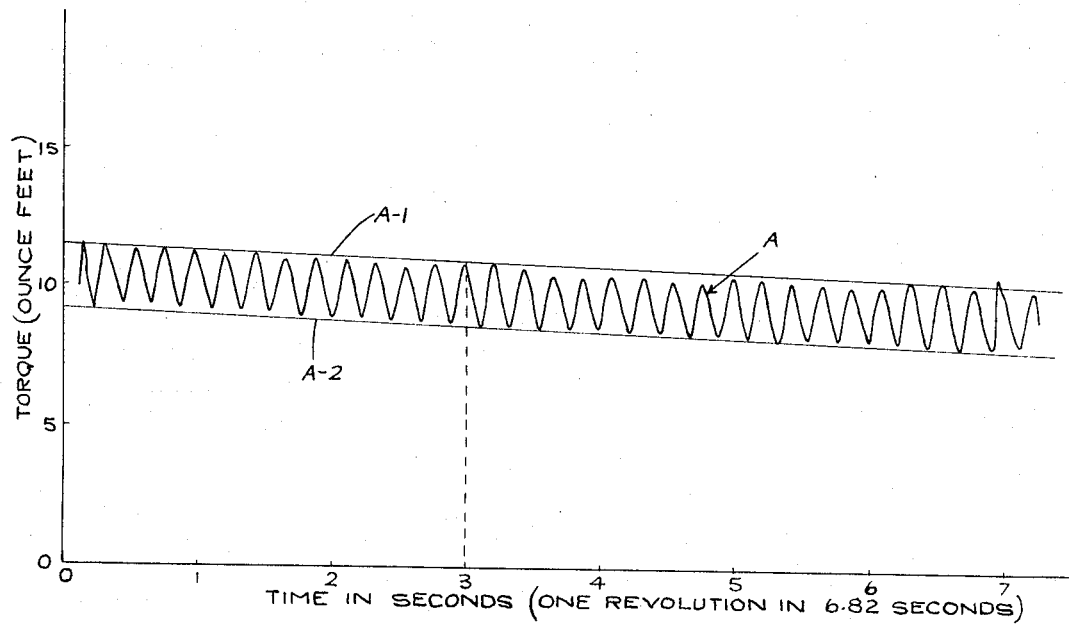
FIG. 3 is a graph illustrating a locked rotor torque curve for a two pole, resistance split-phase motor incorporating aluminum main windings and copper starting windings with backlash winding sections.

This stator assembly, when built into a motor and tested, provided a locked rotor torque curve or trace A as shown in FIG. 3. Using 3 seconds after beginning the tests as a reference, the maximum locked torque was about 11.0 ounce feet; the minimum locked rotor torque was about 8.4 ounce feet; the average locked rotor torque was about 9.7 ounce feet. The slope of the lines A–1 and A–2, fitted to trace A in FIG. 3 indicate that the drop off in locked rotor torque due to heating was about 0.2 ounce feet per second. The trace A (as well as trace B to be described in conjunction with FIG. 4 hereinafter) was made by a test procedure using a test rotor and pair of test bearings that supported the rotor for rotation in the bore of the stator assembly under test.

The windings of the stator assembly to be tested were then connected to a conventional nominal 110 volt alternating current source. However, the rotor was restrained from freely rotating because it was connected, through a LeBow solid state torque transducer (as will be understood) to the output of a 400:1 gear reduction motor with an output speed of 8.8 r.p.m. Essentially the only criteria concerning the selection of the gear reduction motor was that it have sufficient torque to restrain the test rotor so that the test rotor turned at a substantially constant speed of 8.8 r.p.m.

The output of the torque transducer, which represented a varying resistance, was then amplified in a conventional manner to provide a time varying d.c. output voltage that thus varied as the output torque of the rotor varied during each revolution (about 6.82 seconds per revolution) thereof. Because of the low speed of the rotor, the output torque thereof was taken, as will be understood, to be the locked rotor torque thereof.

The time varying d.c. output voltage was then visually displayed on an oscillograph and recorded on an oscillogram as a torque versus time trace. Traces made in this manner were then used to make FIGS. 3 and 4 herein. The same test procedures and conditions were followed; and the same rotor and bearing system were used to test the motors for which the trace data of FIGS. 3 and 4 were obtained.

Figure 4:
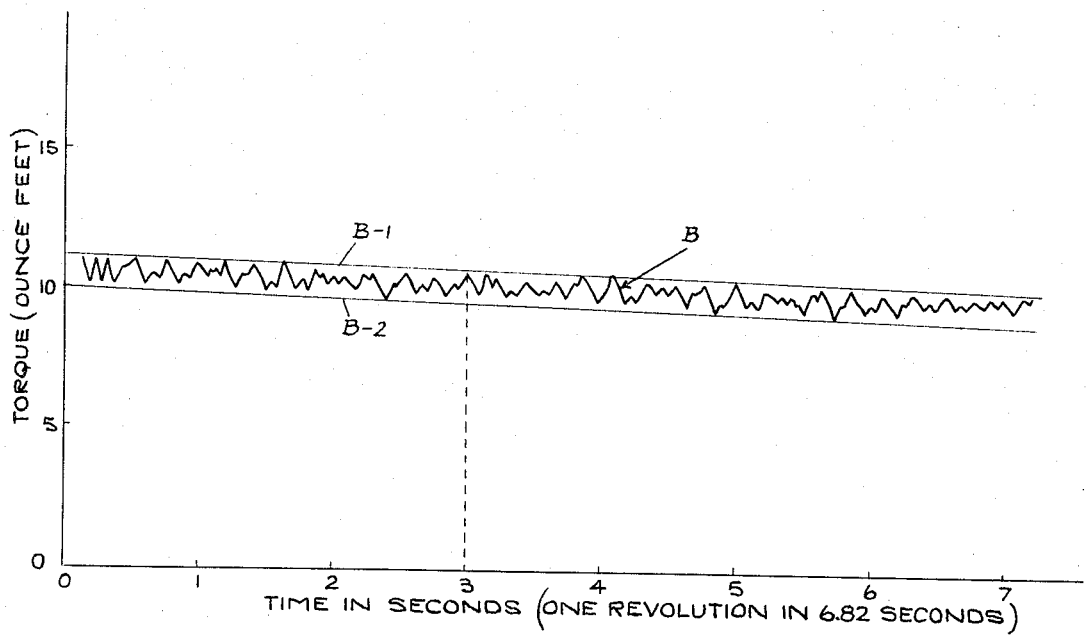
FIG. 4 is a locked rotor torque curve of the general type shown in FIG. 3, but for a motor embodying the present invention.

An improved stator assembly embodying the invention was made and built into an improved motor that, upon testing, produced a locked rotor torque curve or trace B as shown in FIG. 4. Before considering trace B in detail, the winding arrangements for this stator assembly and materials used therein will first be described. This second improved, stator assembly (embodying the invention in one form) was also wound as a two pole, resistance split-phase alternating current stator and was designed to have, as near as possible, the same operating and starting (i.e., performance) characteristics as the stator just described. Accordingly, the same core lamination design was used and the same stack height, i.e., 1 ¾ inches was used. The bore was about 2 ⅜ inches.

Accordingly, the main winding was formed of 0.0380 inch EC aluminum wire, it being noted that the conductivity of EC aluminum wire is known to be about 62 percent of the conductivity of the International Annealed Copper Standard. Thus, EC aluminum is commonly identified as having a conductivity of 62% IACS or as having a relative electrical conductivity (i.e., relative to copper) of 0.62.

The main winding coils in each pole or section $18a$, $18b$, were formed so that the coils $M_1$, $M_2$, $M_3$, $M_4$, and $M_5$ each had, respectively, 28, 43, 57, 67, and 70 turns for a total of 265 turns. About 0.774 pounds of EC aluminum wire was used with a conductor length of about 275 feet per main pole and a resistance of about 3.21 ohms per pole.

However, the starting or auxiliary winding was formed from a material that was preselected to have an electrical conductivity, with reference to IACS of about 0.40 or less and to have what will be referred to herein as a "characteristic ratio 'R'" of a value described below, where "R" is defined by the equation:

$$R = \rho/C_p\, d$$

In the above equation that defines the ratio $R$, $\rho$ is the electrical resistivity of the material at 20°C; as expressed in micro-ohm centimeters. Also, $d$ is the weight density, at 20°C, in grams per cubic centimeter (gm/cc or gm/cm$^3$), and $C_p$ is specific heat, at 25°C, of the preselected material and expressed in the cgs units of calories per gram per degree centigrade (cal/gm °C).

For purposes of information, it is noted that electrical conductor copper (of the type used in the starting winding of the previously described motor) would have a weight density of about 8.9 gm/cm$^3$; a resistivity of about $1.72 \times 10^{-6}$ ohm centimeters or 1.72 micro-ohm centimeters, and a specific heat of about 0.092 cal/gram °C so that the "characteristic ratio" or R for such copper material would be about 2.2. The dimensional units for R may be readily ascertained from the above equation as being (micro-ohms) (°C) (cm)$^4$/(cal); but will not be again referred to herein. It is also noted that EC aluminum would have an R value of about 5 when the resistivity, specific heat, and weight density are about (in the units referred to above), respectively: 2.78, 0.2, and 2.6. It would be generally desirable to preselect starting winding material having a conductivity of about 40% IACS or less and having physical and electrical properties such that the characteristic ratio R for the material is greater than about 6 or 7, e.g., 6.5; it being noted that at least one material (copper-clad steel or copper-coated steel) having an R equal to about 6.8 could be useable to advantage in some inductive device applications.

Additional materials will be specifically identified hereinafter that have the desired properties; but, for purposes of exemplification, an aluminum alloy material was chosen for which R was calculated to be about 10.6. The selected conductor material, to be described in more detail hereinafter, had an electrical conductivity of about 29% IACS AT 20°C. One commercial source of an aluminum alloy material having these desirable characteristics is Aluminum Company of America, and such material is marketed by that company and is more conventionally used for rivets and zippers and is relatively "springy."

This material was obtained as 0.0269 inch diameter wire, insulated with magnet wire varnish or enamel in the usual manner, and used to form the starting winding of the improved stator assembly. Accordingly, the starting winding sections 20a, 20b were formed of 0.0269 inch diameter aluminum alloy wire. The coils $S_1$, $S_2$ and $S_3$ of each starting winding section 20a, 20b respectively had 21, 21 and and 33 turns; whereas coils $S_4$ of each starting winding section 20a, 20b respectively had 42 forward turns and six reverse turns for a total of 48 turns (12 backlash and 36 effective) and a grand total of 123 turns per winding. Compared to the earlier described motor, a startling reduction in backlash turns was accomplished since less than 10 percent of the start turns were backlash turns.

About 0.167 pounds of the 5056 alloy material was used in this starting winding, with a conductor length, per starting section or pole, of about 118 feet and a resistance of about 12.4 ohms. Somewhat surprisingly and unexpectedly, this improved motor exhibited improved starting torque characteristics as revealed by trace or curve B in FIG. 4.

For example, with reference to the three second torque values for curve B, the maximum locked rotor torque again was 11 ounce feet, but the minimum torque was increased to 9.6 ounce feet, the average torque increased to 10.3 ounce feet, and the drop off in torque due to heating was also improved and only about 0.13 ounce feet per second. Drop off in torque is, of course, important because; in the event that a rotor for a resistance start motor does not start moving when the motor is first energized (e.g., when the rotor is "locked" or "stalled"), the locked rotor torque will undesirably continue to decrease as shown by curves A and B. The drop off torque for curve B was determined from the slope of lines B-1 and B-2, which were fitted to curve B, as will be understood.

For completeness of description, some of the published properties and characteristics for the 5056 alloy and other alloys having relative conductivities and characteristics within the above mentioned preferred ranges will be presented hereinafter in tabular form. For this same reason, published data generally describing the material content of each of the tabulated alloys is also presented in tabular form.

For purposes of clarifying terminology used herein, it should also be noted that when the term "relative resistivity" is used herein, the term means the reciprocal of the relative conductivity. Also, for ease of conversion of dimensional units, it is noted that a specific heat of about 0.22 cal/gram °C is about equivalent to 410 joules/lb °C.

It will be noted from the tables presented below that the weight density and specific heat of the tabulated alloys are generally comparable to those characteristics of EC aluminum. It will therefore be understood that since the selected alloy has a relatively high relative resistivity of 345% IACS (i.e., 1/0.29 IACS), as compared to EC aluminum which has a relative resistivity of about 1/0.62 IACS or 162% IACS; alloy wire having a larger diameter and thus larger cross-sectional area as compared to EC aluminum wire will be used. Thus, for a given current the current density would be less in the alloy than in EC aluminum for a specified or given temperature rise. Therefore, larger diameter and therefore generally stronger wire may be used in a starting winding as compared to an EC aluminum conductor. This in turn can result in various manufacturing advantages as will be discussed in more detail hereinafter.

The following Table I sets forth, inter alia, some of the properties of the aluminum based alloys referred to above and identified by alloy numbers 2219, 5056, 5083, 5356 and 5456 in the Alcoa Aluminum Handbook published by Aluminum Company of America in 1959, 1962, and 1967. It will, of course, be borne in mind that any material selected, whether based on aluminum, copper, steel, tungsten, silver, etc., is to be drawn into relatively thin wire.

TABLE I

| Alloy | Density (D.) at 20° C. | | Melting range, approximate ° F. | Electrical conductivity at 20° C., percent of IACS | Specific heat ($C_p$) at 25° C., cal./gm. ° C. |
|---|---|---|---|---|---|
| | G./cm.³ | Lb./cu. in. | | | |
| 2219 | 2.832 | 0.1023 | 1,010-1,190 | 28 | .207 |
| 5056 | 2.642 | 0.0954 | 1,055-1,180 | 29 | .216 |
| 5083 | 2.660 | 0.0961 | 1,075-1,185 | 29 | .214 |
| 5356 | 2.643 | 0.0955 | 1,060-1,180 | 29 | .216 |
| 5456 | 2.652 | 0.0958 | 1,055-1,180 | 29 | .215 |

According to the above referenced Alcoa publication, these alloys further have nominal chemical compositions as shown in Table II below.

TABLE II

| Alloy | Percent | | | | | | | | |
|---|---|---|---|---|---|---|---|---|---|
| | Si | Fe | Cu | Mn | Mg | Cr | Zn | Ti | Other |
| 2219 | 0.20 | 0.30 | 5.8 to 6.8 | 0.20 to 0.40 | 0.02 | | 0.10 | 0.02 to 0.10 | 0.15 |
| 5056 | 0.30 | 0.40 | 0.10 | 0.05 to 0.20 | 4.5 to 5.6 | 0.05 to 0.20 | 0.10 | | 0.15 |
| 5083 | 0.40 | 0.40 | 0.10 | 0.30 to 1.0 | 4.0 to 4.9 | 0.05 to 0.25 | 0.25 | 0.15 | 0.15 |
| 5356 | 0.50 Si plus Fe | | 0.10 | 0.05 to 0.20 | 4.5 to 5.5 | 0.05 to 0.20 | 0.10 | 0.06 to 0.20 | 0.15 |
| 5456 | 0.40 Si plus Fe | | 0.10 | 0.50 to 1.0 | 4.7 to 5.5 | 0.05 to 0.20 | 0.25 | 0.20 | 0.15 |

In Table II above, only the alloying materials are listed. It will be understood that aluminum comprised the balance or remainder of each listed alloy and that "other" represented impurities (on a percent by weight basis) or nonanalyzed materials.

It will be recalled that the motor having characteristics shown by curve B exhibited, after three seconds, an increase in minimum torque of about 15 percent; an increase in average torque of about 5 percent; and a desirable 36 percent reduction in torque drop off due to heating. This motor also, somewhat surprisingly, exhibited a reduced third harmonic dip in the speed torque curve as compared to the motor from which the curve A data was obtained.

A further desirable feature of the alloy material used in the exemplification described above is that its resistance may be expected, with a 90 percent confidence level, to vary not more than about 3 percent from lot to lot with the same wire diameter. Thus, it would not be necessary to vary wire diameter, from lot to lot, in order to provide wire having a desired total resistance per unit length of wire. This desirable feature is believed primarily to be due to the fact that the alloying constituents (i.e., non-aluminum constituents) were about 4 percent or more of the total alloy on a weight basis and, therefore, probably more readily controlled.

It will be understood that with the use of preselected auxiliary winding material as taught above, backlash turns may be completely eliminated in both new and at least some existing motor designs; i.e., motors having a specified winding arrangement.

For example, one existing two pole, resistance split-phase induction motor design had an 0.0359 inch diameter EC aluminum main winding with 0.563 pounds of conductor arranged in 257 turns per pole with a resistance of 5.78 ohms per pole. Coils $M_1$, $M_2$, $M_3$, $M_4$, and $M_5$ of each main winding section or pole had 38, 43, 51, 63, and 62 turns respectively. An 0.0179 inch diameter copper start winding was utilized with 0.352 pounds of conductor arranged in 208 turns per pole, and with a resistance of 11.5 ohms.

Coils $S_1$, $S_2$, and $S_3$ had 22, 38, and 54 turns respectively. Coil $S_4$ in each pole was provided with a total of 94 turns. Of these, 60 turns were forward turns and 34 turns were backward turns. Thus, coil $S_4$ had 26 net effective turns and 68 backlash section turns.

For purposes of comparison, a stator assembly for a motor embodying one form of the present invention was then designed to have operating characteristics similar to those of the motor just described and, except for unexpectedly improved characteristics of the type discussed hereinabove with FIG. 4, similar starting characteristics so as to provide desired start relay characteristics.

The stator assembly so designed employed 0.0359 inch diameter EC aluminum wire for the main winding with 256 turns and a total conductor weight of about 0.563 pounds. The resistance of the main winding was 5.78 ohms. The start winding was made of 0.0269 inch diameter 5056 aluminum alloy wire with 139 turns per pole, a conductor weight of about 0.156 pounds, and a resistance of about 11.6 ohms. Coils $M_1$, $M_2$, $M_3$, $M_4$ and $M_5$ of each main winding section respectively had 37, 41, 53, 63, and 62 turns. The coils $S_1$, $S_2$, $S_3$ and $S_4$ of each starting winding section respectively had 24, 34, 39, and 42 turns for a total of 139 turns per pole or section. None of these turns were used as backlash winding turns.

By comparison of the materials used in the two stator assemblies just described, it will be appreciated that utilization of the present invention can result in extremely large savings, both in amount of material used, types of material used; as well as in improved winding arrangements.

There are still further advantages resulting from the use of conductor material other than EC copper or EC aluminum wire for the starting windings where such conductor material has a relatively high resistivity. The very substantial reduction in the number of backlash turns (or complete elimination thereof) provides a reduction in the internally induced start winding voltage. This reduction has been estimated to be, on the average, about 65 percent. Furthermore, since the diameter of a relatively high resistivity wire will be greater than that of an EC conductor wire that would provide the same total resistance in a given motor design, the wire of preselected material would better withstand stresses during manufacturing that might break a smaller diameter wire. In addition, a wire of relatively high resistivity may now be selected to have a higher tensile strength per diameter increment than heretofore. In the case of the alloy used in the above described preferred exemplification, the tensile strength may be expected to be from about 44,000 to about 52,000 psi; and this increased strength will permit the material to be wound at relatively high speeds on automatic equipment and yet withstand the stresses associated with operation of such equipment.

It should be noted that materials which would be particularly attractive for use are those that are alloys of well-known conductive materials (e.g., copper and aluminum), primarily because of the relatively economical commercial availability of such conductive materials. However, other materials, such as copper plated steel, might also be selected. Based on investigations that I have made of different existing motor designs utilizing conventional start windings with backlash sections, the material actually selected would preferably have a relative conductivity for those designs of less than about 40% IACS, and, desirably, from about 18% to about 34% IACS. Although a relative conductivity greater than about 40% IACS may be desirable for some applications, it should be noted that at least when an aluminum alloy material is used, the relative conductivity would be less than that of EC aluminum, i.e., less than about 60% IACS.

The characteristic ratio R would preferably be greater than the predetermined number discussed hereinabove. For example, I have determined that materials having an R value of 15 or more and also meeting the other selection criteria mentioned above may be advantageously used.

Although the resistivity or specific resistance is used above in the calculation of the ratio R for preselected materials, it may occur that the published or given data concerning a material under consideration will be expressed in terms of conductivity or in terms of conductivity relative to copper at 20°C. In this event, it will be helpful tp recall that resistivity may be determined by dividing 1.72 micro-ohm centimeters by the known value for conductivity at about 20°C of the material relative to IACS, (expressed in decimal form). Furthermore, when the conductivity is stated in terms of mhos per centimeter, the resistivity (in ohm-centimeters) will be the reciprocal of the conductivity and may then be easily expressed as micro-ohm centimeters to determine the R ratio given above.

Although the invention has been illustrated and described in connection with specific exemplifications of single phase motor stator assemblies having a main (or first) and an auxiliary (or second) winding, the polar axes of the windings may be angularly displaced in quadrature or non-quadrature relationship. It will thus be understood by those skilled in the art that the invention and benefits derived therefrom may be incorporated in other types of dynamoelectric machines or assemblies having other winding arrangements and different numbers of poles comprised of one or more coil groups having one or more coils therein of at least one turn each. In addition, although all of the stator assemblies actually constructed as described hereinabove had a bore of about 2.4 inches in diameter and an outer diameter approximately in the neighborhood of 4¾ to 4⅞ inches; assemblies embodying the invention may be of any selected size.

Moreover, although the invention has been described with extensive reference being made, for purposes of exemplification, to inductive devices in the form of induction motor stator assemblies (e.g., wound stator cores); and although extensive reference has been made to one specific preselected material for the same reasons; it will be understood that the invention may be used to benefit in connection with various inductive devices; such as, e.g., thermally responsive relays. Furthermore, various materials, preselected as taught hereinabove may be utilized.

Therefore, while I have shown and described what at present are considered to be preferred and alternate embodiments of my invention in accordance with the Patent Statutes, changes may be made therein without actually departing from the true spirit and scope of the invention. Accordingly, I intend to cover in the following claims all such equivalent variations as fall within the invention.

What I claim as new and desire to secure by Letters Patent of the United States is:

1. A stator assembly for a resistance split-phase induction motor including a magnetic core having regions for accommodating winding turns, a first winding having turns thereof disposed accommodated by the magnetic core thereby to establish first polar axes, and a second winding having turns thereof accommodated by the magnetic core thereby to establish second polar axes angularly displaced from the first polar axes; at least some of the turns of said second winding comprising a conductor formed from preselected winding material having a characteristic ratio R greater than about 6.5, where R is determined by the relationship $\rho/C_p d$, where: $\rho$ is the electrical resistivity in micro-ohm centimeters of the preselected winding material, $C_p$ is the specific heat in calories per degree Centigrade gram of the preselected winding material, and $d$ is the weight density in grams per cm$^3$ of the preselected winding material; thereby to at least reduce the number of backlash winding turns needed in the second winding to produce a desired motor performance.

2. The stator assembly of claim 1 wherein the first and second windings each comprise a plurality of coils having at least one winding turn each, and wherein the preselected winding material is an alloy of aluminum that includes an alloying metal that comprises at least about 4 percent by weight of the alloy.

3. The stator assembly of claim 1 wherein said first winding comprises a plurality of coils each having at least one winding turn; the second winding includes a plurality of winding coils each having at least one winding turn; and wherein the preselected winding material is an alloy of aluminum.

4. The stator assembly of claim 3 wherein the preselected winding material has an electrical conductivity less than about 40 percent IACS and includes at least about 4% by weight magnesium.

5. A stator assembly for a dynamoelectric machine comprising a laminated magnetic core having coil accommodating regions and a plurality of winding turns supported thereon; at least some of said winding turns being formed from a preselected winding material having a characteristic ratio R greater than about 6.5 where R is defined by the relationship $\rho/C_p d$, where: $\rho$ is the electrical resistivity, in micro-ohm centimeters of the preselected winding material, $C_p$ is the specific heat in calories per degree Centigrade per gram of the preselected winding material, and $d$ is the weight density in grams per cubic centimeter of the preselected winding material; thereby to provide a dynamoelectric machine having at least some winding turns formed of a relatively high resistivity as compared to the resistivity of electrical conductor copper.

6. The stator assembly of claim 5 wherein at least some of said plurality of winding turns are arranged to establish first polar axes; and other ones of said plurality of winding turns establish other polar axes angularly displaced from the first polar axes; and wherein the preselected winding material is an alloy of aluminum.

7. The stator assembly of claim 6 wherein the preselected winding material is of a given diameter and the tensile strength of the preselected winding material is greater than the tensile strength of a conductor formed of EC aluminum and of the same given diameter.

8. A stator assembly for a resistance split-phase induction motor, a magnetic stator core member having a plurality of winding slots formed therein each having a closed end; a primary field winding comprising at least two primary poles having a primary polar axis, each primary winding pole comprising a plurality of coils each having sides occupying a different pair of said slots at the closed ends thereof; and an auxiliary field winding comprising at least two auxiliary poles each having an auxiliary polar axis angularly displaced from the primary polar axis; each primary pole comprising a plurality of coils of winding turns and having sides occupying a different pair of said slots; at least some of the winding turns of the auxiliary being formed of an aluminum alloy wire having a nominal electrical conductivity of from about 18% IACS to about 40% IACS.

9. The stator assembly of claim 8 wherein the primary pole of the stator assembly is adapted for connection in series circuit relation with a current responsive relay arranged to selectively supply excitation current to the auxiliary winding and wherein the auxiliary winding turns in each auxiliary pole are wound in the same direction.

10. The stator assembly of claim 8 wherein the auxiliary and primary windings are arranged to be connected in parallel circuit relation; the resistance-to-reactance ratios of the primary and auxiliary windings are preselected to establish phase displaced winding currents in the primary and auxiliary windings during concurrent excitation of said windings; and wherein the aluminum alloy auxiliary winding turns in each auxiliary winding pole provide an electrical resistance of a magnitude thereby to reduce the need for auxiliary winding turns arranged in substracting magnetic relation in an auxiliary pole relative to other auxiliary winding turns in the same auxiliary pole, when excited, is reduced.

* * * * *

UNITED STATES PATENT OFFICE
CERTIFICATE OF CORRECTION

Patent No. 3,774,062                          Dated November 20, 1973

Inventor(s)  John H. Johnson

It is certified that error appears in the above-identified patent and that said Letters Patent are hereby corrected as shown below:

In column 6, line 44, change "nonethelss" to --nonetheless--.

In column 7, line 63, delete "Thus".

In column 8, line 20, after "starting" insert --winding--.

In column 10, line 4, after "1 3/4" insert --(one and three-quarters)--.

In column 10, line 5, after "2 3/8" insert --(two and three-eighths)--.

In column 10, line 56, change --R-- to --"R"--.

In column 10, line 65, change "AT" to --at--.

In column 11, line 11, delete "and" (second occurrence).

In colunn 14, line 49, change "tp" to --to--.

In column 16, line 27, after "motor" insert --the assembly comprising--.

In column 16, line 39, after "auxiliary" insert --poles--.

Signed and sealed this 22nd day of April 1975.

(SEAL)
Attest:

RUTH C. MASON
Attesting Officer

C. MARSHALL DANN
Commissioner of Patents
and Trademarks